(12) United States Patent
Fujimoto et al.

(10) Patent No.: US 10,226,961 B2
(45) Date of Patent: Mar. 12, 2019

(54) SOUNDPROOF WHEEL FOR RAILWAY VEHICLE

(71) Applicant: NIPPON STEEL & SUMITOMO METAL CORPORATION, Tokyo (JP)

(72) Inventors: Takahiro Fujimoto, Kobe (JP); Hideki Minami, Kyoto (JP); Shingo Abe, Amagasaki (JP); Masanori Nakae, Sanda (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 81 days.

(21) Appl. No.: 15/328,072

(22) PCT Filed: Jul. 16, 2015

(86) PCT No.: PCT/JP2015/003587
§ 371 (c)(1),
(2) Date: Jan. 23, 2017

(87) PCT Pub. No.: WO2016/013181
PCT Pub. Date: Jan. 28, 2016

(65) Prior Publication Data
US 2017/0203610 A1    Jul. 20, 2017

(30) Foreign Application Priority Data
Jul. 24, 2014    (JP) .................................. 2014-150798

(51) Int. Cl.
*B60B 17/00* (2006.01)
*F16F 15/12* (2006.01)

(52) U.S. Cl.
CPC .......... *B60B 17/0024* (2013.01); *B60B 17/00* (2013.01); *B60B 17/0003* (2013.01);
(Continued)

(58) Field of Classification Search
CPC ............ B60B 17/0024; B60B 17/0003; B60B 17/0068; B60B 2900/131; B60B 2900/133; F16F 15/12
(Continued)

(56) References Cited

U.S. PATENT DOCUMENTS 4,183,572 A * 1/1980 Albrecht ............. B60B 17/0017
295/7
4,254,985 A * 3/1981 Kirschner ........... B60B 17/0027
295/6

(Continued)

FOREIGN PATENT DOCUMENTS

DE    3120068    12/1982
DE    195 09 389    8/1996
(Continued)

*Primary Examiner* — Kip T Kotter
(74) *Attorney, Agent, or Firm* — Clark & Brody (57) ABSTRACT

This soundproof wheel includes a soundproofing device (3) which is mounted to an inner peripheral surface (6) of a rim section (5) of the wheel. The soundproofing device (3) is provided with: a fixing ring (10) which is fitted in and fixed to a groove (8) formed in the inner peripheral surface (6); a first elastic body section (11A) which is stuck to an outer peripheral surface (10a) of the fixing ring (10), is disposed within the groove (8), and has a plurality of first elastic body pieces; an additional mass section (12) which is stuck to a side of the first elastic body section (11A) opposite to the fixing ring (10), is disposed within the groove (8), and has a plurality of additional mass pieces; and a second elastic body section (11B) which is stuck to a side of the additional mass section (12) opposite to the first elastic body section (11A), is disposed within the groove (8), and has a plurality of second elastic body pieces. The soundproofing device (3) includes a plurality of dynamic vibration absorbers. Each of the dynamic vibration absorbers has first and second elastic body pieces and an additional mass piece. This soundproof (Continued)

wheel allows for significant reduction in wheel vibration noise and is highly durable.

4 Claims, 10 Drawing Sheets

(52) U.S. Cl.
CPC ........ *F16F 15/12* (2013.01); *B60B 2900/131* (2013.01); *B60B 2900/133* (2013.01); *B60Y 2200/30* (2013.01)

(58) Field of Classification Search
USPC .......................................................... 295/7
See application file for complete search history.

(56) References Cited

U.S. PATENT DOCUMENTS

| | | | | |
|---|---|---|---|---|
| 4,353,586 A | | 10/1982 | Raquet et al. | |
| 4,364,594 A | * | 12/1982 | Raquet | B60B 17/0017 295/7 |
| 4,496,183 A | * | 1/1985 | Kasper | B60B 17/0017 105/452 |
| 4,970,909 A | * | 11/1990 | Pelzer | F16H 55/14 74/443 |
| 5,873,617 A | * | 2/1999 | Ortiz | B60B 17/0017 295/7 |
| 9,770,942 B2 | * | 9/2017 | Fujimoto | B60B 17/0024 |

FOREIGN PATENT DOCUMENTS

| | | |
|---|---|---|
| JP | 54-140065 | 10/1979 |
| JP | 56-021903 | 2/1981 |
| JP | 58-116202 | 7/1983 |
| JP | 10-081104 | 3/1998 |
| JP | 2577323 | 7/1998 |
| JP | 3097831 | 10/2000 |
| JP | 2006-182136 | 7/2006 |
| KR | 20-2012-0001961 | 3/2012 |

\* cited by examiner

SOUNDPROOF WHEEL FOR RAILWAY VEHICLE

TECHNICAL FIELD

The present invention relates to a soundproof wheel for a railway vehicle.

BACKGROUND ART

The noise generated when a railway vehicle travels is a top-priority issue to be solved for railroad wayside environments. Such noise includes those generated from wheels. Noise generated from a wheel includes wheel rolling noise and so-called squeak noise. The squeak noise is mostly generated when a vehicle passes a curved road having a large curvature. The wheel rolling noise is generated not only when a vehicle passes a curved road but also when it passes a straight road.

The surface of a rail, as well as the surface of a wheel (tread) which comes into contact therewith have minute unevenness. As a result, when the wheel rolls on the rail, the wheel and the rail are excited, conceivably causing wheel rolling noise. It is also conceived that the squeak noise is attributable to the vibration of the wheel. There is a case in which a portion in the rail, which comes into contact with a tread of the wheel, has wave-like wear (hereafter, referred to as "wavy wear"). As a peculiar wheel noise, when the vehicle passes on a rail which has such wavy wear, the wheel is severely excited, thus causing noise.

To reduce the noise generated by the vibration of a wheel (hereafter, referred to as "wheel vibration noise"), Patent Literatures 1 and 2 have proposed a soundproof wheel in which a soundproofing device is attached to an inner peripheral side of a rim section of the wheel. Such a soundproof wheel is equipped with a soundproofing device which is composed of a combination of an elastic body section such as rubber and an additional mass section and a soundproofing device is attached to an attachment groove formed in an inner peripheral surface of the rim section with a metal attachment.

Such a soundproofing device is considered to act as a dynamic vibration absorber. A dynamic vibration absorber has a resonance frequency, which coincides with a natural frequency of a structure, and can absorb (reduce) the vibration of the structure through resonance. Therefore, by attaching such a soundproofing device to a wheel, it is possible to reduce the noise due to natural vibration of the coinciding frequency. The resonance frequency f of a soundproofing device is given by:

$$f = (1/2\pi) \times k/m)^{1/2} \tag{1}$$

where $\pi$ is the circular constant, k is a spring constant of the elastic body section, and m is the mass of the additional mass section. Therefore, given a natural frequency of a wheel, it is possible to determine the spring constant k and the mass m of the additional mass section from Formula (1) such that the resonance frequency f of the soundproofing device coincides with the natural frequency.

A wheel normally has multiple natural vibration modes, and natural frequencies corresponding to each of those natural vibration modes. Therefore, a wheel has multiple natural frequencies. Patent Literatures 2 and 3 have proposed a soundproof wheel including a plurality of soundproofing devices each having a different resonance frequency, in which the resonance frequency of each sound proofing device coincides with any of the multiple natural frequencies of the wheel. According to these soundproof wheels, it is possible to concurrently reduce noise corresponding to multiple natural frequencies.

Specifically, in the wheel of Patent Literature 2, two soundproofing devices are used in which two types of elastic bodies each having a different elastic constant are used respectively, such that the resonance frequencies of the two soundproofing devices are different from each other. In the wheel of Patent Literature 3, a soundproofing device (a dynamic vibration absorber consisting of an elastic body and an abutment plate) is divided in a circumferential direction of the soundproof wheel, and an adjustment is made such that each resonance frequency of the divided soundproofing devices coincides with any of natural frequencies of the wheel. Such a configuration makes it possible to concurrently absorb noise components corresponding to two or more levels of frequencies. Further, as a result of being divided in the circumferential direction of the soundproof wheel, the soundproofing device disclosed in Patent Literature 3 makes it possible to increase the natural frequencies of the abutment plate to higher frequencies which will not cause any problem as noise.

Among natural vibration modes of a wheel, a primary mode which may cause wheel rolling noise is one in which the rim section vibrates in an in-plane direction and the plate section vibrates in an out-of-plane direction. Such noise due to natural vibrations include at least, 3 levels of frequency components, for example, around 2 kHz, around 3 kHz, and around 4 kHz in a range of 1 kHz to 10 kHz of frequency ranges to which human auditory sense is sensitive.

Meanwhile, when a vehicle is traveling at a high speed, the soundproofing device is subject to various forces, causing a risk that the soundproofing device falls off from the wheel. In the inventions according to Patent Literatures 1 to 3, sufficient measures have not been taken to prevent the soundproofing device from falling off from the wheel.

Patent Literature 4 discloses a soundproofing device including a ring-shape additional mass section, and an elastic body section attached to an outer peripheral portion of the additional mass section. In this soundproofing device, the elastic body section is disposed within a groove formed in a rim section.

The soundproof wheel of Patent Literature 4 is configured such that the elastic body section is fixed to a bottom portion of a groove formed in the rim section and to the additional mass section, while the additional mass section is movable with respect to the rim section. Such configuration allows absorption of vibration of the wheel.

In this soundproofing device, since the opening side of the groove is blocked by the additional mass section with respect to the elastic body section, the elastic body section is not likely to fall off from the wheel even if it is separated from the additional mass section. However, in this invention, when the elastic body section deteriorates, the displacement of the additional mass section with respect to the rim section during travelling of the vehicle increases, and the additional mass section may collide with other members, such as a brake disk. Moreover, as a result of that the inner surface of the groove of the rim section and the additional mass section are rubbed against each other, a flaw may occur in the rim section and the additional mass section, or these members may be worn. Further, when the elastic body section is separated completely, there is possibility that additional mass section falls off from the wheel. For this reason, a wheel equipped with the soundproofing device is less durable.

CITATION LIST

Patent Literature

Patent Literature 1: Japanese Utility Model No. 2577323
Patent Literature 2: Japanese Patent No. 3097831
Patent Literature 3: Japanese Patent Application Publication No. 58-116202
Patent Literature 4: Japanese Patent Application Publication No. 2006-182136

SUMMARY OF INVENTION

Technical Problem

Accordingly, it is an objective of the present invention to provide a soundproof wheel for a railway vehicle, which allows for significant reduction in noise caused by the vibration of the wheel, and is also excellent in durability.

Solution to Problem

The soundproof wheel of the present invention is a soundproof wheel for a railway vehicle with a soundproofing device mounted onto an inner peripheral surface of a rim section of the wheel. The soundproofing device includes a fixing ring, a first elastic body section, an additional mass section, and a second elastic body section. The fixing ring is fixed to the rim section with at least an outer peripheral portion of the fixing ring fitted in a groove formed along a circumferential direction in the inner peripheral surface of the rim section. The first elastic body section is stuck to an outer peripheral surface of the fixing ring, and is disposed within the groove. The additional mass section is stuck to a side of the first elastic body section opposite to the fixing ring, and is disposed within the groove. The second elastic body section is stuck to a side of the additional mass section opposite to the first elastic body section, and is provided in the groove in such a way that no gap is formed between the second elastic body section and a bottom of the groove. The first elastic body section includes a plurality of first elastic body pieces which are spaced apart from each other in a circumferential direction of the fixing ring. The second elastic body section includes a plurality of second elastic body pieces which are spaced apart from each other in the circumferential direction of the fixing ring. The additional mass section includes a plurality of additional mass pieces which are spaced apart from each other in the circumferential direction of the fixing ring. Each additional mass piece is stuck to any of the plurality of first elastic body pieces, and any of the plurality of second elastic body pieces. The wheel has multiple natural frequencies corresponding to multiple natural vibration modes. The soundproofing device includes a plurality of dynamic vibration absorbers. Each dynamic vibration absorber has the additional mass piece, and the first and second elastic body pieces which are stuck to the concerned additional mass piece. At least one dynamic vibration absorber of the plurality of dynamic vibration absorbers has a resonance frequency different from the resonance frequency of another dynamic vibration absorber. Any of the resonance frequencies of the plurality of dynamic vibration absorbers corresponds to any of the multiple natural frequencies.

A spacer member may be provided between the second elastic body section and the bottom of the groove.

The soundproof wheel preferably includes a protrusion interposed between the dynamic vibration absorbers adjacent to each other, and protruding from the outer peripheral surface of the fixing ring. When the soundproof wheel includes the protrusion, a distal end of the protrusion may be in contact with the bottom of the groove.

Advantageous Effects of Invention

According to the present invention, the vibration of a wheel is transmitted from the rim section to the plurality of dynamic vibration absorbers (the first and second elastic body pieces, and additional mass pieces) through the fixing ring. Since at least one dynamic vibration absorber of the plurality of dynamic vibration absorbers has a resonance frequency different from the resonance frequency of another dynamic vibration absorber, the resonance frequency of each dynamic vibration absorber corresponds to any of the multiple natural frequencies of the wheel, it is possible to concurrently reduce noise corresponding to natural frequencies of not less than 2 levels, thereby significantly reducing wheel vibration noise. Each dynamic vibration absorber includes first and second elastic body pieces, and spring constants of the first and second elastic body pieces can be selected independently. Therefore, a large degree of freedom is given for adjustment of the resonance frequency of each dynamic vibration absorber.

Moreover, according to the present invention, the first and second elastic body sections and the additional mass section are disposed within a groove of the rim section, and a fixing ring fixed to the rim section is present on an opening side of the groove with respect to the first and second elastic body sections and the additional mass section. For this reason, even if the additional mass section is separated from the first and second elastic body sections, or the first and second elastic body sections are respectively separated from the fixing ring and the bottom of the groove, it is less likely that thus separated first and second elastic body sections, and the additional mass section fall off the wheel.

Further, due to the configuration that the fixing ring which is one of the components constituting the soundproofing device is fixed to the rim section of the wheel, there will be no rubbing between the soundproofing device and the rim section of the wheel. Furthermore, even if the elastic body section deteriorates, resulting in decline in elasticity thereof, the additional mass section will not collide with any member outside the groove. Therefore, the soundproof wheel is highly durable.

DESCRIPTION OF EMBODIMENTS

Hereafter, embodiments of the present invention will be described in detail with reference to the appended drawings.

Figure 1A:
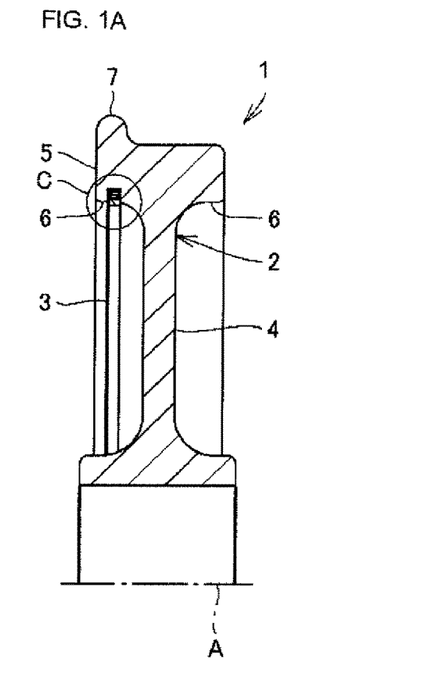
FIG. 1A is a sectional view of a soundproof wheel according to an embodiment of the present invention, showing one side portion of the soundproof wheel with respect to its central axis.
Figure 1B:
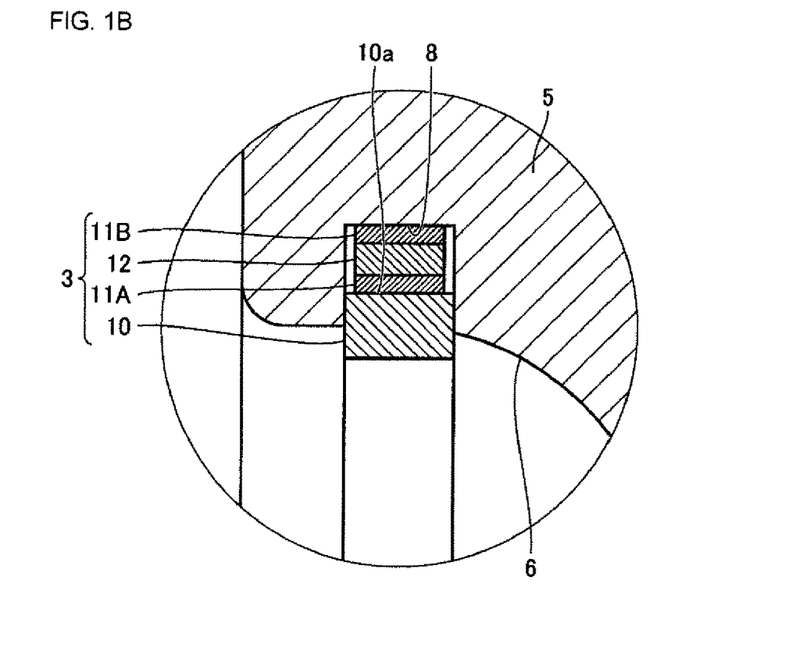
FIG. 1B is an enlarged view of a region shown by a circle C in FIG. 1A.

FIGS. 1A and 1B are sectional views of a soundproof wheel according to an embodiment of the present invention. FIG. 1A is a view showing one side portion of the soundproof wheel with respect to its central axis, and FIG. 1B is an enlarged view of a region shown by a circle C in FIG. 1A.

The soundproof wheel 1, which is used for railway vehicles, includes a wheel 2 and a soundproofing device 3. The wheel 2 includes an annular plate section 4, and an annular rim section 5 located in an outer peripheral portion of the plate section 4. The rim section 5 protrudes to both sides in the thickness direction of the plate section 4 with respect to the plate section 4, and has an inner peripheral surface 6 which faces a central axis A of the soundproof wheel 1. In an outer peripheral surface of the rim section 5, a flange 7 protrudes, at one side with respect to the direction along the central axis A, in the opposite direction to the central axis A.

In the rim section 5, a groove 8, which opens up in a direction toward the central axis A, is formed in an annular shape around the central axis A in the inner peripheral surface 6 on one side (the same side of the flange 7) with respect to the direction along the central axis A. The soundproofing device 3 is fitted in the groove 8 over the entire circumference of the groove 8.

The soundproofing device 3 includes a fixing ring 10, a first elastic body section 11A, an additional mass section 12, and a second elastic body section 11B. The first elastic body section 11A is stuck to an outer peripheral surface 10a of the fixing ring 10. The additional mass section 12 is stuck to a side of the first elastic body section 11A opposite to the fixing ring 10. The second elastic body section 11B is stuck to a side of the additional mass section 12 opposite to the first elastic body section 11A. The fixing ring 10 is made of a high rigidity material such as a metal including steel. The fixing ring 10 has an outer peripheral side portion in the radial direction to be fitted in the groove 8 and fixed to the rim section 5. The fixing of the fixing ring 10 to the rim section 5 can be performed by, for example, welding, caulking, bonding, etc.

A width (length in an axial direction of the soundproofing device 3) of the fixing ring 10 is about the same as a width of the groove 8, and the opening part of the groove 8 is sealed by the fixing ring 10. The first elastic body section 11A, the additional mass section 12, and the second elastic body section 11B are disposed within this sealed space in the groove 8. Widths of the first and second elastic body sections 11A, 11B and the additional mass section 12 are narrower than the width of the fixing ring 10, and the first and second elastic body sections 11A, 11B and the additional mass section 12 are spaced apart from the inner wall of the groove 8. The second elastic body section 11B is in contact with the bottom of the groove 8.

The first elastic body section 11A and the second elastic body section 11B may be made of the same kind of material, or kinds of materials which are different from each other. The first and second elastic body sections 11A, 11B may be made of, for example, rubber. The vibration generated in the wheel 2 while a vehicle is travelling is transmitted to the first and second elastic body sections 11A, 11B, and the additional mass section 12 through the fixing ring 10 and the rim section 5, thereby causing the first and second elastic body sections 11A, 11B and the additional mass section 12 to vibrate.

The first and second elastic body sections 11A, 11B and the additional mass section 12 are disposed within the groove 8 of the rim section 5. Moreover, the fixing ring 10 fixed to the rim section 5 is present on an opening side of the groove 8 with respect to the first and second elastic body sections 11A, 11B and the additional mass section 12. For that reason, even if the first elastic body section 11A is separated from the fixing ring 10 or the additional mass section 12, and the second elastic body section 11B is separated from the bottom of the groove 8 or the additional mass section 12, the additional mass section 12 is not likely to fall off the soundproof wheel 1.

Due to the configuration that the fixing ring 10 which is one of the components constituting the soundproofing device 3 is fixed to the rim section 5 of the wheel 2, there will be no rubbing between the soundproofing device 3 and the rim section 5 of the wheel 2. Moreover, due to the configuration that the additional mass section 12 is present in the groove 8 which is sealed by the fixing ring 10, even if the first and second elastic body sections 11A, 11B deteriorate, resulting in decline in elasticity thereof, the additional mass section 12 will not collide with any member (for example, a brake disc) outside the groove 8. Therefore, the soundproof wheel 1 is highly durable.

Figure 2:
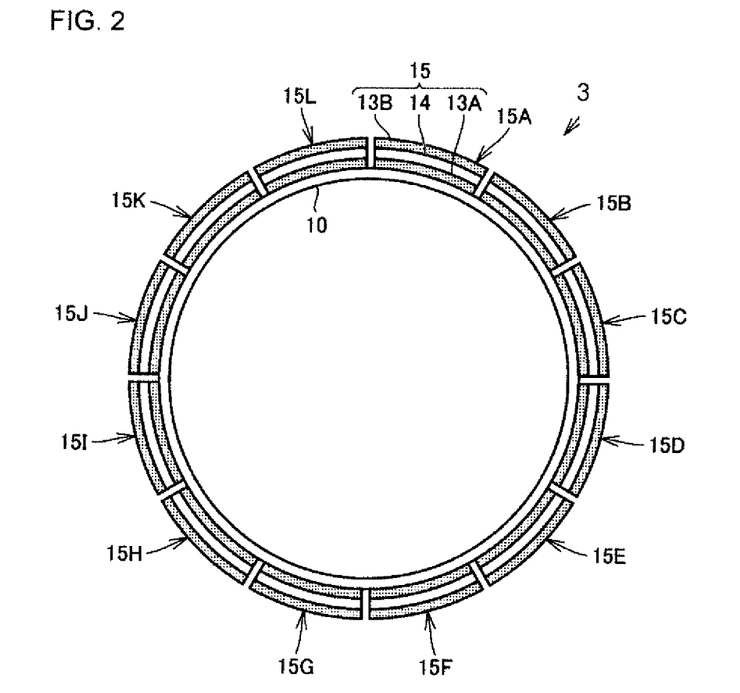
FIG. 2 is a plan view to show an example of a soundproofing device which can be used for a soundproof wheel of the present invention.

FIG. 2 is a plan view to show an example of the soundproofing device 3.

The first elastic body section 11A includes a plurality of first elastic body pieces 13A spaced apart from each other in a circumferential direction of the soundproofing device 3. The additional mass section 12 includes a plurality of additional mass pieces 14 spaced apart from each other in the circumferential direction of the soundproofing device 3. The second elastic body section 11B includes a plurality of second elastic body pieces 13B which are spaced apart from each other in the circumferential direction of the soundproofing device 3. In the example of FIG. 2, the first and second elastic body sections 11A and 11B include 12 first and second elastic body pieces 13A and 13B respectively, and the additional mass section 12 includes 12 additional mass pieces 14. Each additional mass piece 14 is stuck to any of the first elastic body pieces 13A and any of the second elastic body pieces 13B.

The second elastic body piece 13B may be stuck to the bottom of the groove 8. Also, the second elastic body piece 13B may not be stuck to the bottom of the groove 8 and in this case, it is necessary that the second elastic body piece 13B is sufficiently pressed by the additional mass piece 14 and the bottom of the groove 8. In either case, the soundproof wheel having the soundproofing device 3 is configured such that even if the additional mass piece 14 vibrates during travelling of a railway vehicle equipped with this soundproof wheel, a gap between the second elastic body piece 13B and the bottom of the groove 8 will not be generated.

Each additional mass piece 14 and the first and second elastic body pieces 13A, 13B stuck to the concerned additional mass piece 14 constitute a dynamic vibration absorber 15. In the example of FIG. 2, the soundproofing device 3 includes 12 dynamic vibration absorbers 15A to 15L. Regarding the circumferential direction of the soundproofing device 3, the additional mass piece 14 and the first and second elastic body pieces 13A, 13B, which constitute each dynamic vibration absorber 15, have a substantially flush end face.

The wheel 2 normally has multiple natural frequencies respectively corresponding to multiple natural vibration modes. At least one dynamic vibration absorber 15 of the dynamic vibration absorbers 15A to 15B, has a resonance frequency different from that of another dynamic vibration absorber 15. That is, the dynamic vibration absorbers 15A to 15L have at least two resonance frequencies. Any of the resonance frequencies of the dynamic vibration absorbers 15A to 15L coincides with any of the natural frequencies of the wheel 2. As a result, it is possible to concurrently reduce noise corresponding to at least two natural frequencies, among the multiple natural frequencies of the wheel 2.

The dynamic vibration absorbers 15A to 15L preferably have at least three resonance frequencies, each of which coincides with any natural frequency of the wheel 2. This makes it possible to efficiently reduce noise of the wheel 2.

As described above, wheel rolling noise due to natural vibrations of the plate section 4 and the rim section 5 is generated from the wheel 2. Such noise includes, for example, frequency components of 2.0 kHz, 2.5 kHz, and 3.0 kHz in frequency ranges to which human auditory sense is sensitive, for example, a range of 1 kHz to 10 kHz.

Accordingly, for example, it may be assumed that the dynamic vibration absorbers 15A to 15L are divided into the following first to third groups. The dynamic vibration absorbers 15 belonging to the first group each have a resonance frequency of 2.0 kHz. The dynamic vibration absorbers 15 belonging to the second group each have a resonance frequency of 2.5 kHz. The dynamic vibration absorbers 15 belonging to the third group each have a resonance frequency of 3.0 kHz. As a result, it is possible to significantly reduce noise in auditory sense. The first to third groups can be each made up of 4 dynamic vibration absorbers 15.

Moreover, configuring any of the dynamic vibration absorbers 15A to 15L to have a resonance frequency corresponding to a frequency of squeak noise makes it possible to reduce the squeak noise. Similarly, configuring any of the dynamic vibration absorbers 15A to 15L to have a resonance frequency corresponding to a frequency of noise attributable to wavy wear makes it possible to reduce such noise.

The resonance frequency of each of the dynamic vibration absorbers 15A to 15L can be made to have a desired value by appropriately selecting a spring constant $k_1$ of the first elastic body piece 13A, a spring constant $k_2$ of the second elastic body piece 13B, and a mass in of the additional mass piece 14 based on the following Formula (2):

$$f=(1/2\pi)\times((k_1+k_2)/m)^{1/2} \quad (2)$$

Due to the configuration that even if the additional mass piece 14 vibrates during travelling of a railway vehicle equipped with this soundproofing device 3, a gap between the second elastic body piece 13B and the bottom of the groove 8 will not be generated, the resonance frequency of each dynamic vibration absorber 15A to 15L will be maintained at a value as designed.

The soundproof wheel 1 can be produced by first providing the soundproofing device 3 with a disconnected part in the circumference thereof, and after fitting the additional mass section 12, the first and second elastic body sections 11A, 11B, and an outer peripheral portion of the fixing ring 10 in the groove 8 of the rim section 5, joining the disconnected sections of the soundproofing device 3 by, for example, welding.

Regarding the axial direction of the soundproofing device 3, the lengths of the first and second elastic body sections 11A, 11B (each first and second elastic body piece 13A, 13B) are not less than 5 mm and not more than 10 mm, and the length of the additional mass section 12 (each additional mass piece 14) is not less than 5 min and not more than 10 mm. As a result of the first and second elastic body sections 11A, 11B, and the additional mass section 12 having such sizes, attachment thereof to the fixing ring 10, and adjustment of resonance frequencies thereof become easy.

Figure 3:
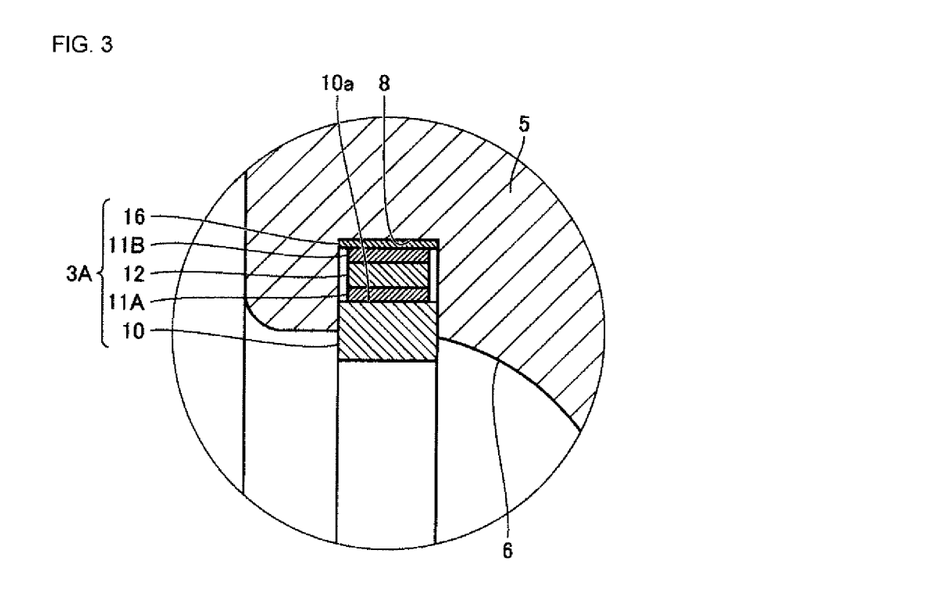
FIG. 3 is a sectional view to show a surrounding portion of a groove of a soundproof wheel according to a first variation of the embodiment shown in FIGS. 1A and 1B.

FIG. 3 is a sectional view to show a surrounding portion of a groove of a soundproof wheel according to a first variation of the embodiment shown in FIGS. 1A and 1B. FIG. 3 shows a section including a central axis of the soundproof wheel. In FIG. 3, components corresponding to the components shown in FIG. 1B are given the same reference symbols as those of FIG. 1B, thus omitting description thereof.

In this variation, a spacer member 16 is provided so as to contact closely with the bottom of the groove 8 and fill the spacing between the second elastic body section 11B and the bottom of the groove 8. Therefore, although the second elastic body section 11B is spaced apart from the bottom of the groove 8, there is no gap (void) between the second elastic body section 11B and the bottom of the groove 8. The spacer member 16 is made of a high rigidity material, for example, a metal such as steel.

The spacer member 16 may be a ring-shape member which is continuous over the entire circumference of the soundproofing device like the fixing ring 10, or may include multiple members which are spaced apart from each other in the circumferential direction of the soundproofing device. In either case, as with the embodiment shown in FIGS. 1A and 1B, it is possible to design the dynamic vibration absorber so as to have a desired resonance frequency according to Formula (2) described above.

Figure 4:
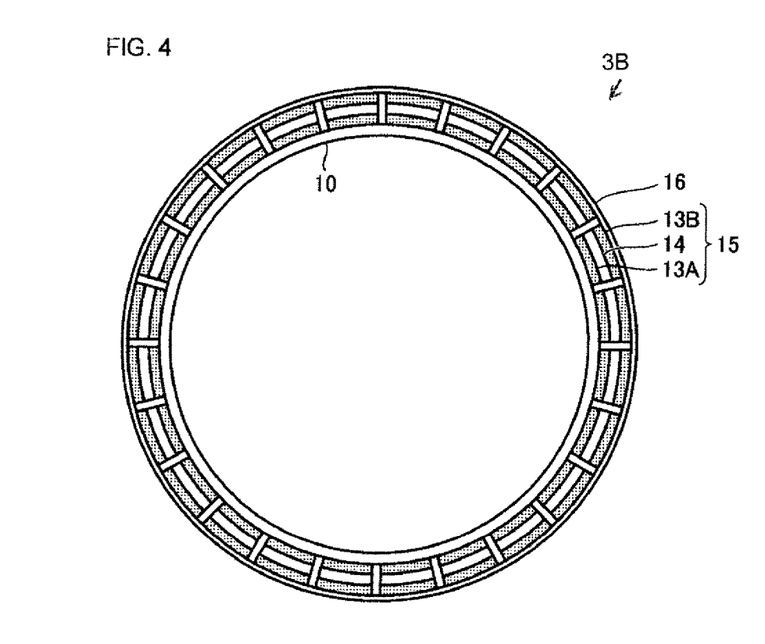
FIG. 4 is a plan view to show another example of the soundproofing device which can be used for the soundproof wheel of the present invention.

FIG. 4 is a plan view to show another example of the soundproofing device which can be adopted in the soundproof wheel of FIGS. 1A and 1B. In FIG. 4, components corresponding to the components shown in FIG. 2 are given the same reference symbols as those of FIG. 2, thus omitting description thereof.

The soundproofing device 3B includes a ring-shape spacer member 16 which is continuous over the entire circumference thereof. The spacer member 16 may be stuck to the second elastic body piece 13B. Moreover, the spacer member 16 may not be stuck to the second elastic body piece 13B and in this case, it is necessary that the second elastic body piece 13B is sufficiently pressed by the additional mass piece 14 and the spacer member 16. In either case, the soundproofing device 3B is configured such that even if the additional mass piece 14 vibrates during travelling of a railway vehicle equipped with the soundproofing device 3B, a gap between the second elastic body piece 13B and the spacer member 16 will not be generated. This allows the resonance frequency of each dynamic vibration absorber 15 to be maintained at a value as designed.

In the soundproof wheel of the present invention, the number of the dynamic vibration absorbers 15 will not be limited. For example, 12 dynamic vibration absorbers 15 may be provided as shown in FIG. 2, or 24 dynamic vibration absorbers 15 may be provided as shown in FIG. 4. In the case of the soundproofing device 3B of FIG. 4, since the number of the dynamic vibration absorbers 15 increases compared with in the soundproofing device 3 of FIG. 2, it is possible to increase the number of resonance frequencies of the dynamic vibration absorbers 15 which correspond to natural vibration of the wheel 2. Further, since even when the first or second elastic body piece 13A, 13B of some of the dynamic vibration absorbers 15 deteriorates, resulting in deterioration of the performance as the dynamic vibration absorber 15, vibration can be reduced by other dynamic vibration absorbers 15, it is possible to suppress deterioration in performance of controlling vibration (reducing noise caused by vibration) of the wheel 2. It becomes easier to obtain such effect as the number of the dynamic vibration absorbers 15 increases.

On the other hand, increase in the number of the dynamic vibration absorbers 15 will result in decrease in the lengths of the additional mass piece 14 and the first and second elastic body pieces 13A, 13B in the circumferential direction of the wheel 2. As a result, the additional mass piece 14 may become more likely to be separated from the fixing ring 10 (and the spacer member 16) due to deterioration of the first and second elastic body pieces 13A, 13B. It is possible to make such separation less likely to occur by decreasing the number of the dynamic vibration absorbers 15, thereby increasing the lengths in the circumferential direction of the wheel 2 for the additional mass piece 14 and the first and second elastic body pieces 13A, 13B. However, since the additional mass piece 14 remains in the groove 8 sealed by the fixing ring 10 even if it is separated from the fixing ring 10 (and the spacer member 16), the possibility that it falls off is very low.

Figure 5:
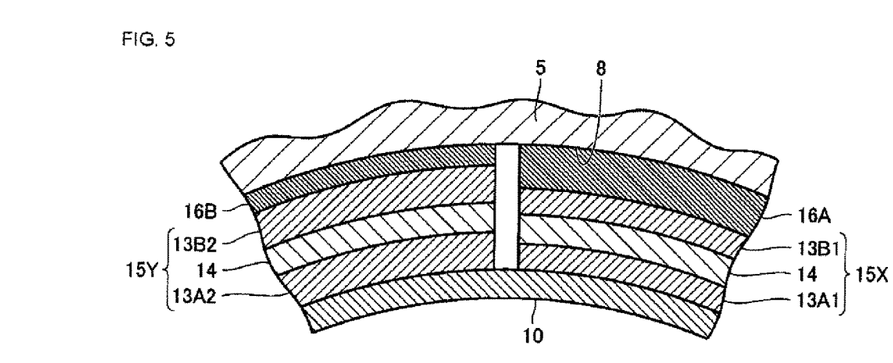
FIG. 5 is a sectional view to show the surrounding of a groove of a soundproof wheel according to a second variation of the embodiment shown in FIG. 1A to FIG. 2.

FIG. 5 is a sectional view to show the surrounding of a groove of a soundproof wheel according to a second variation of the embodiment shown in FIG. 1A to FIG. 2. FIG. 5 shows a section perpendicular to the central axis of the soundproof wheel. In FIG. 5, components corresponding to the components shown in FIGS. 3 and 4 are given the same reference symbols as those of FIGS. 3 and 4, thus omitting description thereof.

In this soundproofing device, the spacer member includes a spacer member 16A and a spacer member 16B, which are spaced apart in the circumferential direction of the soundproofing device, and have different thicknesses. This soundproofing device includes a dynamic vibration absorber 15X and a dynamic vibration absorber 15Y. The dynamic vibration absorber 15X includes a first elastic body piece 13A1, an additional mass piece 14, and a second elastic body piece 13B1. The dynamic vibration absorber 15Y includes a first elastic body piece 13A2, an additional mass piece 14, and a second elastic body piece 13B2.

The thickness of the additional mass piece 14 of the dynamic vibration absorber 15X is about the same as that of the additional mass piece 14 of the dynamic vibration absorber 15Y. On the other hand, the first elastic body piece 13A2 of the dynamic vibration absorber 15Y has a thickness larger than that of the first elastic body piece 13A1 of the dynamic vibration absorber 15X, and the second elastic body piece 13B2 of the dynamic vibration absorber 15Y has a thickness larger than that of the second elastic body piece 13B1 of the dynamic vibration absorber 15X. Thus, by making the thicknesses of the first and second elastic body pieces 13A1, 13A2, 13B1, 13B2 different from each other, thereby making the spring constant of each of these elastic body pieces, it is possible to configure the dynamic vibration absorber 15X and the dynamic vibration absorber 15Y so as to have desired resonance frequencies which are different from each other.

In this case, as shown in FIG. 5, by making the spacer member 16B of the dynamic vibration absorber 15Y be thinner than the spacer member 16A of the dynamic vibration absorber 15X, it is possible to configure such that the total thickness of the first elastic body piece 13A1, the additional mass piece 14, the second elastic body piece 13B1, and the spacer member 16A substantially equals to the total thickness of the first elastic body piece 13A2, the additional mass piece 14, the second elastic body piece 13B2, and the spacer member 16B. Therefore, according to this configuration, by adopting spacer members 16A, 16B having appropriate thicknesses, it is possible to prevent a gap from being generated between the second elastic body pieces 13B1, 13B2 and the bottom of the groove 8 even when the total thickness of the first and second elastic body pieces 13A1, 13B1 is different from the total thickness of the first and the second elastic body pieces 13A2, 13B2.

Figure 6:
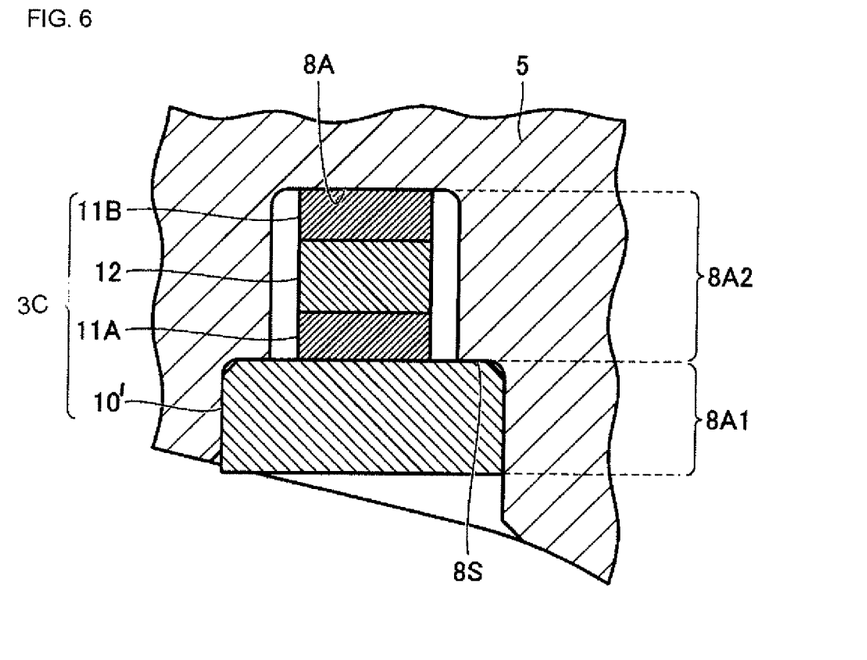
FIG. 6 is a sectional view of a soundproof wheel according to a third variation of the embodiment shown in FIG. 1A to FIG. 2.

FIG. 6 is a sectional view of a soundproof wheel according to a third variation of the embodiment shown in FIG. 1A to FIG. 2. FIG. 6 shows a section including the central axis of a wheel. In FIG. 6, some components corresponding to the components shown in FIG. 1B are given the same reference symbols as those of FIG. 1B, thus omitting description thereof.

In this soundproof wheel, a groove 8A which is opened toward the central axis of the wheel is formed in a rim section 5 of the wheel. A fixing ring 10' included in the soundproofing device 3C is fitted in the groove 8A. As a result, a sealed space is formed in the groove 8A. The first and second elastic body sections 11A and 11B and the additional mass section 12 are disposed within the sealed space in the groove 8A.

The fixing ring 10' has a substantially constant width with regard to the circumferential direction and the radial direction of the soundproofing device 3. The groove 8A includes a first portion 8A1, and a second portion 8A2 which is formed nearer the bottom of the groove 8A with respect to the first portion 8A1. The first portion 8A1 has a width substantially equal to the width of the fixing ring 10'. The second portion 8A2 has a width smaller than the width of the fixing ring 10'. In this embodiment, both of the widths of the first and second portions 8A1 and 8A2 are substantially constant with regard to the radial direction of the soundproofing device 3 respectively, and a step 8S is formed in an inner wall of the groove 8A between the first portion 8A1 and the second portion 8A2

The fixing ring 10' is fixed to the rim section 5 in a state of being in contact with the step 8S. As a result of the second portion 8A2 having a width smaller than the width of the fixing ring 10', the fixing ring 10 cannot move closer to a bottom face of the groove 8A from a state of being in contact with the step 8S. Therefore, in this state, the interval between the fixing ring 10 and the bottom face of the groove 8A is kept constant. This interval is set such that when vibration of a wheel is transmitted to an additional mass section 12, the additional mass section 12 can vibrate, and no gap will be generated between the second elastic body section 11B and the bottom of the groove 8A. As a result, it is possible that the first and second elastic body sections 11A, 11B and the additional mass section 12, which constitute a dynamic vibration absorber, vibrate at a predetermined resonance frequency.

Figure 7A:
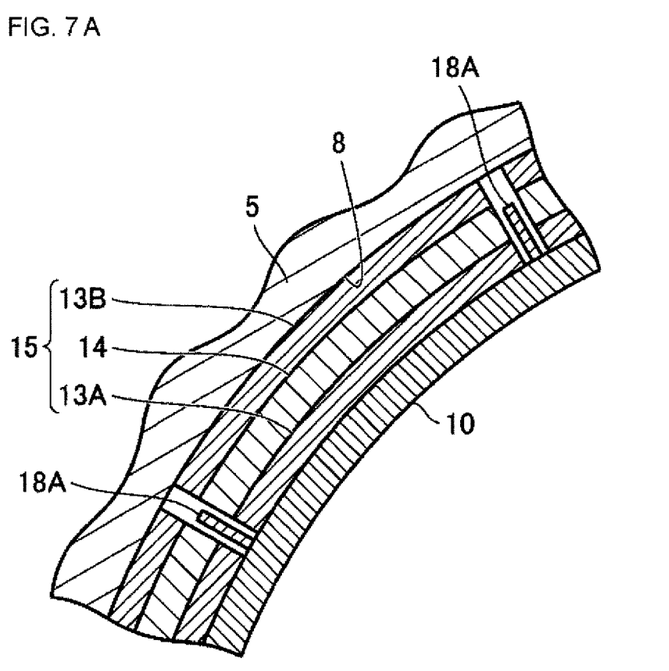
FIG. 7A is a sectional view of a soundproof wheel according to a fourth variation of the embodiment shown in FIG. 1A to FIG. 2.

FIG. 7A is a sectional view of a soundproof wheel according to a fourth variation of the embodiment shown in FIG. 1A to FIG. 2. FIG. 7A shows a section perpendicular to the central axis of a wheel. In FIG. 7A, components corresponding to the components shown in FIG. 1A to FIG. 2 are given the same reference symbols as those of FIG. 2, thus omitting description thereof.

A protrusion 18A protruding from the outer peripheral surface of the fixing ring 10 is provided between dynamic vibration absorbers 15 adjacent to each other in the circumferential direction. The protrusion 18A is fixed to the fixing ring 10, and extends to between the additional mass pieces 14 adjacent to each other in the circumferential direction.

The dynamic vibration absorber 15 and the protrusion 18A are sufficiently spaced apart such that the dynamic vibration absorber 15 will not come into contact with the protrusion 18A even when the dynamic vibration absorber 15 vibrates. Therefore, there will be no case that the dynamic vibration absorber 15 and the protrusion 18A come into contact with each other, impairing the function of the dynamic vibration absorber 15.

When the protrusion 18A is not provided, if the first and second elastic body pieces 13A, 13B break off, problems arise in that as a result of the additional mass piece 14 moving in the groove 8, abnormal noise occurs, and dynamic balance during rotation of the wheel is disturbed. In the embodiment of FIG. 7A, such problems can be prevented from occurring since the additional mass piece 14 is restricted from moving in the circumferential direction of the wheel as a result of the protrusion 18A being provided.

The protrusion 18A may be integral with the fixing ring 10, or a separate body. When the protrusion 18A is a separate body from the fixing ring 10, the protrusion 18A may be made of, for example, the same material as that of the first elastic body piece 13A. In this case, the first elastic body piece 13A and the protrusion 18A can be formed collectively. Specifically, it is possible to form an first elastic body piece 13A and a protrusion 18A collectively by disposing a mold formed with concave parts corresponding to the first elastic body piece 13A and the protrusion 18A over the entire circumference on the outer peripheral surface of the fixing ring 10, poring liquid precursor, which provides raw material for the first elastic body piece 13A and the protrusion 18A, into the concave parts, and thereafter causing the precursor to be hardened.

In this production method, the liquid precursor may intrude into between the outer peripheral surface of the fixing ring 10 and the mold, thereafter being hardened as-is. In this case, the first elastic body piece 13A and the protrusion 18A will not be separated completely, and is formed to be connected with a thin film of elastic body. However, even in this case, each dynamic vibration absorber 15 has a resonance frequency as designed and vibrates in a mutually independent manner. That is, the plurality of first elastic body pieces 13A exhibit substantially same behavior as in the case in which they are spaced apart from each other in the circumferential direction of the fixing ring 10. Therefore, each dynamic vibration absorber can absorb vibration of a predetermined frequency.

Figure 7B:
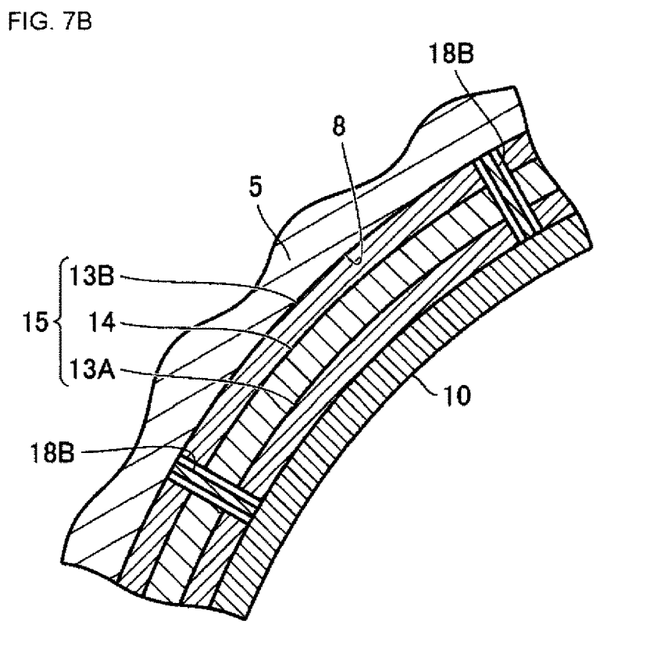
FIG. 7B is a sectional view of a soundproof wheel according to a fifth variation of the embodiment shown in FIG. 1A to FIG. 2.

FIG. 7B is a sectional view of a soundproof wheel according to a variation of the embodiment shown in FIG. 7A. FIG. 7B shows a section perpendicular to the central axis of a wheel. In FIG. 7B, components corresponding to the components shown in FIG. 7A are given the same reference symbols as those of FIG. 7A, thus omitting description thereof.

A protrusion 18B protruding from the outer peripheral surface of the fixing ring 10 is provided between dynamic vibration absorbers 15 adjacent to each other in the circumferential direction. The protrusion 18B is fixed to the fixing ring 10, and extends through between the additional mass pieces 14 adjacent to each other in the circumferential direction. The distal end (the furthest portion from the outer peripheral surface of the fixing ring 10) of the protrusion 18B is in contact with the bottom face of the groove 8. As a result of the protrusion 18B being provided, it is possible, as in the embodiment shown in FIG. 7A, to restrict the additional mass piece 14 from moving in the circumference direction of the wheel when the first and second elastic body pieces 13A, 13B break off, thereby suppressing occurrence of abnormal noise, as well as making it easier to keep dynamic balance during rotation of the wheel.

The protrusion 18B may be integral with the fixing ring 10, or a separate body. Moreover, this soundproof wheel may further include a ring-shape spacer member 16 (see FIG. 4) and in this case, the protrusion 18B may be integral with the spacer member 16, or a separate body. In either case, the protrusion 18B is made of a high rigidity material. As a result, the interval between the fixing ring 10 and the bottom face of the groove 8 is kept constant. This interval is set such that when vibration of a wheel is transmitted to an additional mass section 12, the additional mass piece 14 can vibrate, and no gap will be generated between the additional mass piece 14 and the bottom face of the groove 8 by the vibration of the additional mass piece 14 even when the second elastic body piece 13B is not stuck to the bottom of the groove 8. As a result, it is possible that the dynamic vibration absorber 15 vibrates at a predetermined resonance frequency.

EXAMPLES

A test using a wheel rolling noise tester was conducted on soundproof wheels which were examples of the present invention, and wheels which were comparative examples not satisfying part of the requirements of the present invention, to investigate noise to be generated.

As Examples 1 to 4, soundproof wheels 1 which each includes a soundproofing device 3 having the structure shown in FIG. 2, and in which each dynamic vibration absorber 15A to 15L was any of three types (TYPE-i to TYPE-iii) having different resonance frequencies were fabricated. The natural frequencies of the soundproof wheel 1 corresponding to major natural vibration modes of the wheel 2 were 2.0 kHz, 2.5 kHz, and 3.0 kHz.

Table 1 shows resonance frequencies of the dynamic vibration absorbers 15 of each type. Table 2 shows contents of the dynamic vibration absorbers of the soundproof wheels of Examples, and the wheels of Comparative Examples.

TABLE 1

| Type of soundproofing device | Resonance frequency (kHz) |
|---|---|
| TYPE-i | 2.0 |
| TYPE-ii | 2.5 |
| TYPE-iii | 3.0 |

TABLE 2

| | Soundproofing device | | | | | | | | | | | | Remarks |
|---|---|---|---|---|---|---|---|---|---|---|---|---|---|
| | 15A | 15B | 15C | 15D | 15E | 15F | 15G | 15H | 15I | 15J | 15K | 15L | |
| Example 1 | TYPE-ii | TYPE-i | TYPE-iii | TYPE-ii | TYPE-i | TYPE-iii | TYPE-ii | TYPE-i | TYPE-iii | TYPE-ii | TYPE-i | TYPE-iii | Examples of the present invention |
| Example 2 | TYPE-i | TYPE-i | TYPE-iii | TYPE-iii | TYPE-ii | TYPE-ii | TYPE-i | TYPE-i | TYPE-iii | TYPE-iii | TYPE-ii | TYPE-ii | |
| Example 3 | TYPE-ii | TYPE-i | TYPE-iii | TYPE-iii | TYPE-i | TYPE-ii | TYPE-ii | TYPE-i | TYPE-iii | TYPE-iii | TYPE-i | TYPE-ii | |
| Example 4 | TYPE-i | TYPE-i | TYPE-iii | TYPE-iii | TYPE-i | TYPE-i | TYPE-ii | TYPE-ii | TYPE-iii | TYPE-iii | TYPE-ii | TYPE-ii | |
| Comparative Example 1 | — | — | — | — | — | — | — | — | — | — | — | — | Without soundproofing device |
| Comparative Example 2 | TYPE-i | TYPE-i | TYPE-i | TYPE-i | TYPE-i | TYPE-i | TYPE-i | TYPE-i | TYPE-i | TYPE-i | TYPE-i | TYPE-i | With only one kind of soundproofing device |
| Comparative Example 3 | TYPE-ii | TYPE-ii | TYPE-ii | TYPE-ii | TYPE-ii | TYPE-ii | TYPE-ii | TYPE-ii | TYPE-ii | TYPE-ii | TYPE-ii | TYPE-ii | |
| Comparative Example 4 | TYPE-iii | TYPE-iii | TYPE-iii | TYPE-iii | TYPE-iii | TYPE-iii | TYPE-iii | TYPE-iii | TYPE-iii | TYPE-iii | TYPE-iii | TYPE-iii | |
| Comparative Example 5 | — | — | — | — | — | — | — | — | — | — | — | — | Wheel according to patent Literature 2 |

While four for each of the dynamic vibration absorber 15 of TYPE-i, the dynamic vibration absorber 15 of TYPE-ii, and the dynamic vibration absorber 15 of TYPE-iii were used in any of Examples, positional relationships for the 3 types of the dynamic vibration absorbers 15 were varied from each other among Examples 1 to 4.

As Comparative Examples, an ordinary wheel (Comparative Example 1) having no soundproofing device, a wheel (Comparative Example 2) in which all of the dynamic vibration absorbers 15A to 15L were of TYPE-i, a wheel (Comparative Example 3) in which all of the dynamic vibration absorbers 15A to 15L were of TYPE-ii, a wheel (Comparative Example 4) in which all of the dynamic vibration absorbers 15A to 15L were of TYPE-iii, and a wheel (Comparative Example 5) in which in place of the soundproofing device 3, a soundproof ring adopted in Patent Literature 2 was mounted to the wheel 2 were prepared.

Figure 8:
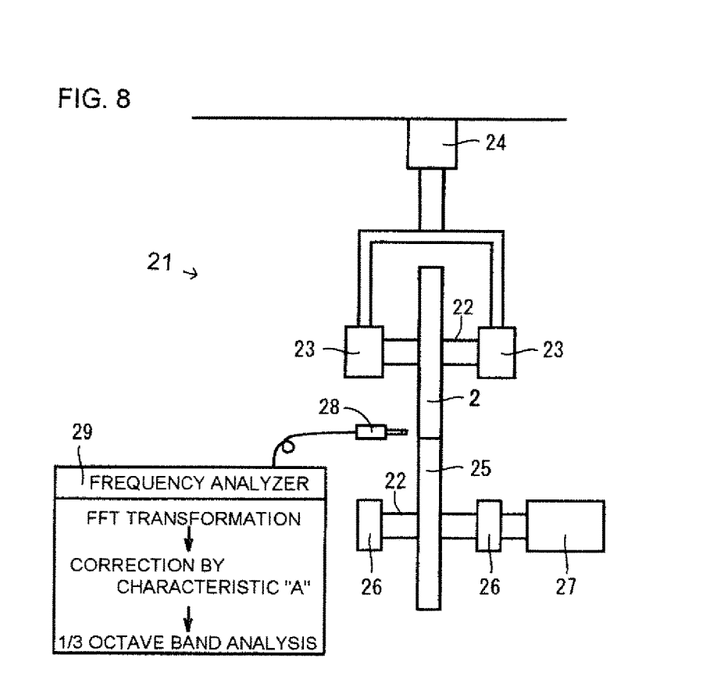
FIG. 8 is a schematic diagram to show a configuration of a wheel rolling noise tester.

FIG. 8 is a schematic diagram to show a configuration of a wheel rolling noise tester used in the test.

The wheel rolling noise tester 21 includes: a bearing 23, a hydraulic jack 24, a rail wheel 25, a bearing 26, a motor 27, a precision noise meter 28, and a frequency analyzer 29. The bearing 23 rotatably supports an axle 22 attached to a wheel 2 (soundproof wheel 1) to be tested. The hydraulic jack 24 was attached to the bearing 23 to press the bearing 23 downward. The rail wheel 25 is configured to abut against an outer peripheral portion of the wheel 2 supported by the bearing 23 through the axle 22, and to rotate the wheel 2. The bearing 26 supports the axle 22 attached to the rail wheel 25. The motor 27 rotatively drives the axle 22 supported by the bearing 26. The precision noise meter 28 measures noise generated from the wheel 2 and generates an electric signal corresponding to the noise. The frequency analyzer 29 receives input of the electric signal from the precision noise meter 28. The frequency analyzer 29 performs frequency analysis of the electric signal.

When performing test, the axle 22 attached to the wheel 2 and the axle 22 attached to the rail wheel 25 were arranged in parallel with each other; the outer peripheral surface of the wheel 2 supported by the bearing 23 through the axle 22 was pressed against the outer peripheral surface of the rail wheel 25 supported by the bearing 26 through the axle 22 by being driven by the hydraulic jack 24; and the rail wheel 25 was rotated by the motor 27 in this state. As the result, the wheel 2 was rotated.

The precision noise meter 28 was disposed at a position 300 mm away from the wheel 2, and generated noise was measured by the precision noise meter 28 by rotating the soundproof wheels 1 of Examples and wheels of Comparative Examples by the wheel rolling noise tester 21. The circumferential speed of the rail wheel 25 during noise measurement was supposed to be the rotational speed of the wheel 2 at that time. The circumferential speed of the rail wheel 25 was determined from the number of revolution of the motor 27 and the diameter of the rail wheel 25 (910 mm in the wheel rolling noise tester 21). For example, when the number of revolution of the motor 27 was 1750 rpm, the circumferential speed of the rail wheel 25 was 300 km/h.

Noise measurement was performed by setting the precision noise meter 28 at FLAT characteristics (without auditory correction) and FAST dynamic characteristics. After the measurement by the precision noise meter 28, frequency analysis of noise was performed by the frequency analyzer 29 based on the inputted signal.

Figure 9:
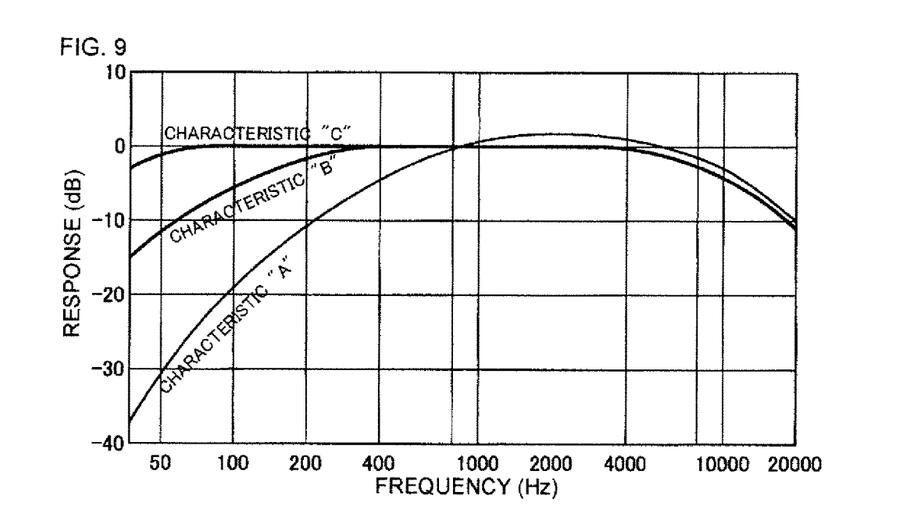
FIG. 9 is a diagram to show noise correction levels to be used when performing noise analysis.

FIG. 9 is a diagram to show noise correction levels to be used when analyzing noise. After applying correction by the characteristic "A" of FIG. 9 on the measured noise, ⅓ octave band processing was performed to determine frequency characteristics and Overall values. The results are shown in FIGS. 10 to 13.

Figure 10:
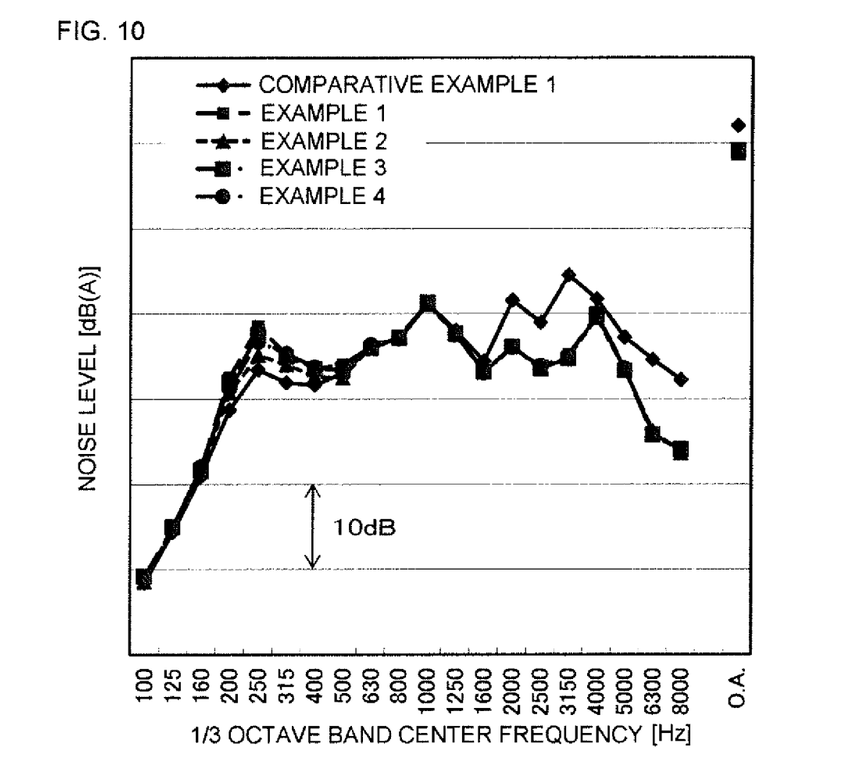
FIG. 10 is a diagram showing a relationship between a ⅓ octave band center frequency and a noise level for Examples 1 to 4 and Comparative Example 1.
Figure 11:
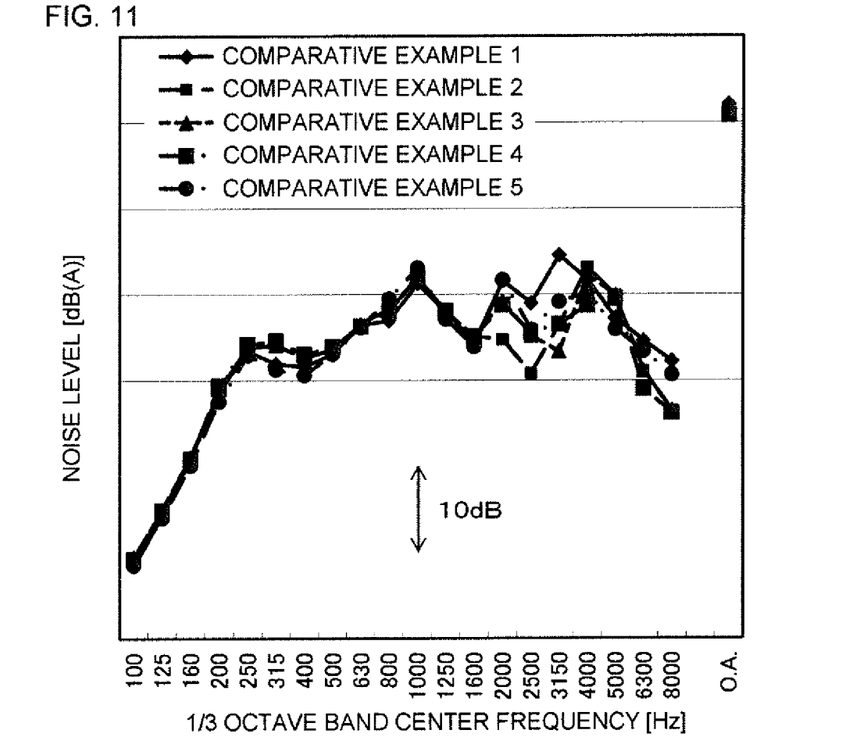
FIG. 11 is a diagram showing a relationship between a ⅓ octave band center frequency and a noise level for Comparative Examples 1 to 5.

FIG. 10 is a diagram showing the relationship between the ⅓ octave band center frequency and the noise level for Examples 1 to 4 and Comparative Example 1. FIG. 11 is a diagram showing the relationship between the ⅓ octave band center frequency and the noise level for Comparative Examples 1 to 5. The results shown in FIGS. 10 and 11 are those obtained when the rotational speed of the wheel 2 (circumferential speed of the rail wheel 25) was 200 km/h. Overall values (O.A.) are shown at near the right end of FIGS. 10 and 11.

From FIG. 10, it is seen that all of the soundproof wheels 1 of Examples 1 to 4 were able to significantly reduce noise around 2.0 kHz, 2.5 kHz, and 3.0 kHz compared with Comparative Examples 1, that is, the case without any soundproofing device. There was no significant difference observed among Examples 1 to 4. That is, there was substantially no difference in noise reduction effect due to the disposition of the dynamic vibration absorbers 15 of TYPE-i to TYPE-iii adopted in Examples 1 to 4.

In contrast to this, as obvious from FIG. 11, the wheels of Comparative Examples 2 to 4 were only able to reduce noise around a frequency of one level of the resonance frequencies of the dynamic vibration absorbers 15, and were not able to reduce noise at other frequencies. The wheel of Comparative Example 5 showed less noise reduction effect compared with the soundproof wheels 1 of Examples 1 to 4 at least in the overall value.

Figure 12:
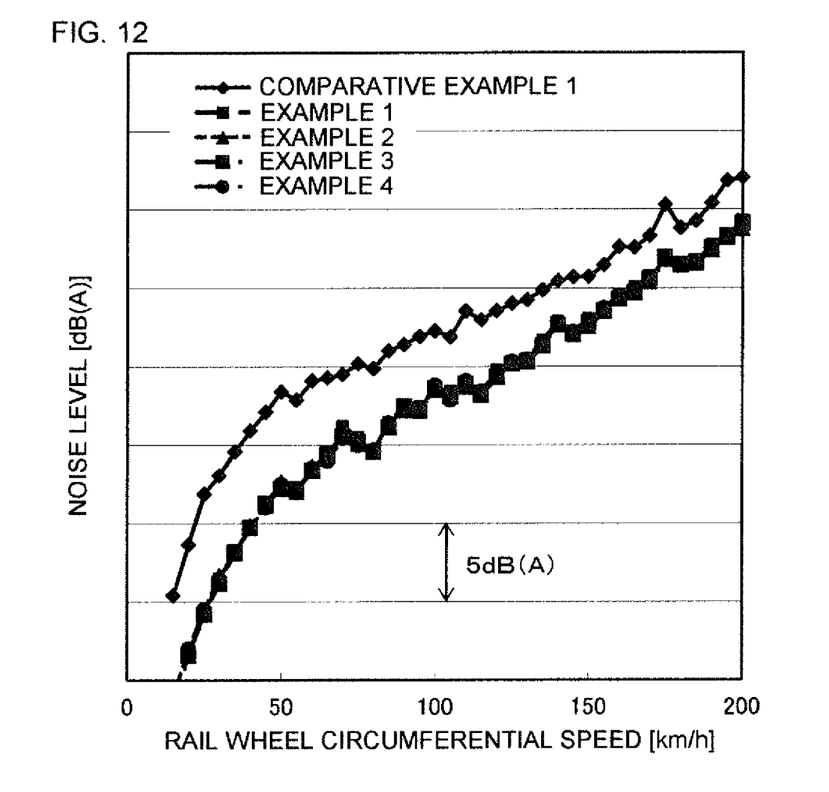
FIG. 12 is a diagram showing a relationship between a circumferential speed of the rail wheel and a noise level for Examples 1 to 4, and Comparative Example 1.
Figure 13:
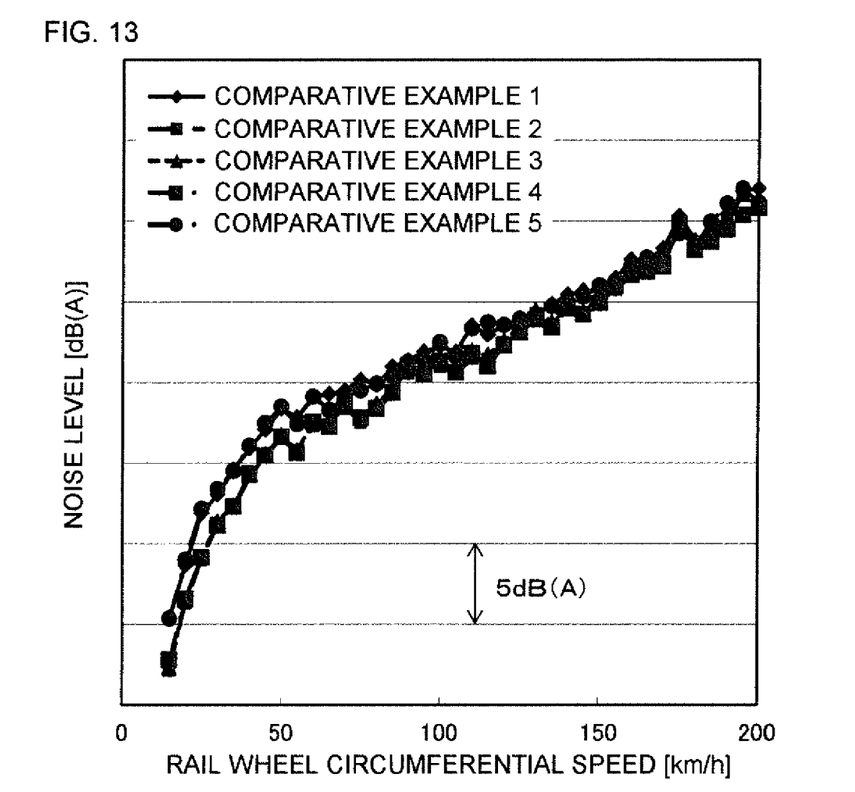
FIG. 13 is a diagram showing a relationship between a circumferential speed of rail wheel and a noise level for Comparative Examples 1 to 5.

FIG. 12 is a diagram showing the relationship between the circumferential speed of the rail wheel 25 and the noise level for Examples 1 to 4, and Comparative Example 1. FIG. 13 is a diagram showing the relationship between the circumferential speed of the rail wheel 25 and the noise level for Comparative Examples 1 to 5. In FIGS. 12 and 13, the noise levels are shown by overall values.

As shown in FIG. 12, compared with the wheel of Comparative Example 1, that is, a wheel without any soundproofing device, the soundproof wheels 1 of Examples 1 to 4 achieved a certain level of noise reduction. The amount of reduction of noise was not less than 5 dB(A) in a low speed range in which the circumferential speed of the rail wheel 25 was not more than 130 km/h, and not less than 3 dB(A) in a high speed range of not less than 140 km/h.

On the other hand, as shown in FIG. 13, there was substantially no noise reduction effect observed in the wheels of Comparative Examples 2 to 5 compared with the wheel of Comparative Example 1.

REFERENCE SIGNS LIST

1 Soundproof wheel
2 Wheel
3, 3A, 3B, 3C Soundproofing device
5 Rim section
6 Inner peripheral surface
8, 8A Groove
10, 10' Fixing ring
10a Outer peripheral surface
11A First elastic body section
11B Second elastic body section
12 Additional mass section
13A First elastic body piece
13B Second elastic body piece
14 Additional mass piece
15, 15A to 15L, 15X, 15Y Dynamic vibration absorber
18A, 18B Protrusion

The invention claimed is:

1. A soundproof wheel for a railway vehicle, comprising
a soundproofing device mounted onto an inner peripheral surface of a rim section of the wheel,
the soundproofing device including:
a fixing ring fixed to the rim section with at least an outer peripheral portion of the fixing ring fitted in a groove formed along a circumferential direction in the inner peripheral surface of the rim section;
a first elastic body section which is stuck to an outer peripheral surface of the fixing ring, and is disposed within the groove;
an additional mass section which is stuck to a side of the first elastic body section opposite to the fixing ring, and is disposed within the groove; and
a second elastic body section which is stuck to a side of the additional mass section opposite to the first elastic body section and is provided in the groove in such a way that no gap is formed between the second elastic body section and a bottom of the groove, wherein
the first elastic body section includes a plurality of first elastic body pieces which are spaced apart from each other in a circumferential direction of the fixing ring,
the second elastic body section includes a plurality of second elastic body pieces which are spaced apart from each other in the circumferential direction of the fixing ring,
the additional mass section includes a plurality of additional mass pieces which are spaced apart from each other in the circumferential direction of the fixing ring, and each additional mass piece is stuck to one of the plurality of first elastic body pieces, and one of the plurality of second elastic body pieces,
the wheel has multiple natural frequencies corresponding to multiple natural vibration modes,
the soundproofing device includes a plurality of dynamic vibration absorbers, each dynamic vibration absorber having the additional mass piece, and the first and second elastic body pieces, which are stuck to the additional mass piece,
at least one dynamic vibration absorber of the plurality of dynamic vibration absorbers has a resonance frequency different from the resonance frequency of another dynamic vibration absorber, and any of the resonance frequencies of the plurality of dynamic vibration absorbers corresponds to any of the multiple natural frequencies.

2. The soundproof wheel according to claim 1, wherein a spacer member is provided between the second elastic body section and the bottom of the groove.

3. The soundproof wheel according to claim 1, further comprising:
a protrusion interposed between the dynamic vibration absorbers adjacent to each other, and protruding from the outer peripheral surface of the fixing ring.

4. The soundproof wheel according to claim 3, wherein a distal end of the protrusion is in contact with the bottom of the groove.

* * * * *